United States Patent
MeVay (10) Patent No.: US 9,203,300 B2
(45) Date of Patent: Dec. 1, 2015

(54) SYSTEMS AND METHODS FOR CONTROLLING POWER CONVERTERS

(75) Inventor: Alex MeVay, Boston, MA (US)

(73) Assignee: Alex Mevay, Boston, MA (US)

( * ) Notice: Subject to any disclaimer, the term of this patent is extended or adjusted under 35 U.S.C. 154(b) by 888 days.

(21) Appl. No.: 12/784,188

(22) Filed: May 20, 2010

(65) Prior Publication Data

US 2010/0295502 A1 Nov. 25, 2010

Related U.S. Application Data

(60) Provisional application No. 61/179,959, filed on May 20, 2009.

(51) Int. Cl.
| | |
|---|---|
| H01M 10/44 | (2006.01) |
| H02M 3/156 | (2006.01) |
| H02M 1/00 | (2007.01) |

(52) U.S. Cl.
CPC ...... *H02M 3/156* (2013.01); *H02M 2001/0009* (2013.01)

(58) Field of Classification Search
USPC ........... 320/101, 138, 139; 323/283, 285, 286
See application file for complete search history.

(56) References Cited

U.S. PATENT DOCUMENTS

| | | | |
|---|---|---|---|
| 5,418,709 A * | 5/1995 | Lukemire | 323/222 |
| 5,949,226 A | 9/1999 | Tanaka et al. | |
| 6,424,129 B1 | 7/2002 | Lethellier | |
| 6,441,597 B1 | 8/2002 | Lethellier | |
| 6,646,450 B2 | 11/2003 | Liebler | |
| 6,737,840 B2 | 5/2004 | McDonald et al. | |
| 6,768,310 B2 * | 7/2004 | Yugo et al. | 324/444 |
| 6,828,762 B2 * | 12/2004 | Brkovic | 323/222 |
| 6,947,300 B2 | 9/2005 | Pai et al. | |
| 7,091,708 B2 * | 8/2006 | Moussaoui | 323/272 |
| 7,095,218 B2 | 8/2006 | Kobayashi | |
| 7,151,361 B2 | 12/2006 | Xi | |
| 7,235,962 B2 | 6/2007 | Mazda | |
| 7,508,182 B1 | 3/2009 | Chang | |
| 7,915,875 B2 * | 3/2011 | Asuke et al. | 323/259 |
| 2007/0139027 A1 * | 6/2007 | Nishimori | 323/283 |
| 2009/0085532 A1 | 4/2009 | Liu et al. | |

OTHER PUBLICATIONS

Alex MeVay's Affidavit, executed Dec. 15, 2010.

* cited by examiner

*Primary Examiner* — Yalkew Fantu (74) *Attorney, Agent, or Firm* — Wilmer Cutler Pickering Hale and Dorr LLP (57) ABSTRACT

A system for controlling a power converter having an inductive component is disclosed. The system includes a low pass filter electrically coupled to the inductive component for producing a source referenced voltage proportional to a current flowing through the inductive component. The system also includes a control device electrically coupled to the low pass filter for calculating the current through the inductive component using the source referenced voltage and controlling the power converter using the calculated current.

12 Claims, 7 Drawing Sheets

SYSTEMS AND METHODS FOR CONTROLLING POWER CONVERTERS

CROSS-REFERENCE TO RELATED APPLICATIONS

This application claims benefit of U.S. Provisional Patent Application Ser. No. 61/179,959, filed May 20, 2009, which is hereby incorporated by reference herein its entirety.

TECHNICAL FIELD

The disclosed subject matter relates to systems and methods for controlling power converters having one or more inductive components.

BACKGROUND

In electrical power converters, the measurement of current is commonly achieved by the use of a low-value shunt resistor to generate a small voltage proportional to the current flowing through the shunt resistor. This voltage is then generally amplified for further use or measurement.

Most power converters contain an inductor or transformer as a magnetic energy storage or transmission element. The current flowing through this magnetic element is generally composed of AC and DC components. The DC component of the current, acting on the inherent resistance of the winding of the magnetic element, creates a small DC voltage drop, which is generally superimposed on AC voltages across the winding which are a consequence of AC currents acting on the effective resistance and the inductance of the magnetic element. Some of these components may be filtered away, leaving a signal that may be proportional to the current through the inductor, the average DC current through the inductor, or some related signal, depending on the transfer function of the filter.

In many applications, this filtered voltage can be used in place of the voltage developed across a shunt resistor, and the shunt resistor may thus be eliminated. Elimination of the shunt resistor can result in higher power conversion efficiency, reduced parts count, reduced system cost, or other advantages.

SUMMARY

The disclosed methods and systems allow for further improvements to electrical power converters by reducing or eliminating the need for filtering, eliminating the need for level-shifting of analog signals, and/or providing a signal of higher amplitude to the filter, thus reducing the need for amplification. Through these improvements, the disclosed methods and systems allow advantages for power conversion systems such as a reduction in parts count, better signal-to-noise ratio, increased efficiency, reduced cost, etc.

The disclosed methods and systems may allow improvements to power converters in many different applications. One application of particular interest is power conversion in solar electric systems. System efficiency lies at the crux of achieving financial feasibility in solar power systems, and any reductions in cost per delivered Watt-hour, such as enabled by the present methods and systems, can enable broader application in wider markets. In a typical application, a power converter is connected between a photovoltaic array and a battery. Using any of several conventional techniques generally known as Maximum Power Point Tracking (MPPT), the power converter is controlled to adjust the operating voltage of the photovoltaic array to maximize the power delivered to the battery. Most control algorithms of this nature require a measure of electrical current, and the present systems and methods allow the measurement of current with greater electrical efficiency and reduced parts cost relative to other techniques, resulting in improved cost-effectiveness and other benefits for the solar power system as a whole.

In one aspect, the disclosed systems relate to a system for controlling a power converter having an inductive component. The system includes a low pass filter electrically coupled to the inductive component for producing a source referenced voltage proportional to a current flowing through the inductive component. The system also includes a control device electrically coupled to the low pass filter for calculating the current through the inductive component using the source referenced voltage and controlling the power converter using the calculated current.

In some aspects, the disclosed methods relate to a method for controlling a power converter having an inductive component. The method includes electrically transmitting a current through the inductive component to a low pass filter; filtering a voltage across the inductive component through the low pass filter to produce a source referenced voltage proportional to the current flowing through the inductive component; electrically transmitting the source referenced voltage to a control device; calculating the current flowing through the inductive component using the source referenced voltage; and controlling the power converter using the calculated current.

In some aspects, the disclosed systems relate to a system for controlling a power converter having an inductive component. The system includes an inductive component including a first conductive winding and a second conductive winding around the inductive component. The system further includes a control device electrically coupled to the first conductive winding and the second conductive winding for measuring voltage values from the first conductive winding and the second conductive winding to calculate a current flowing through the inductive component and controlling one of input current drawn to the power converter and output current flowing out of the power converter using the calculated current.

DETAILED DESCRIPTION

In the descriptions that follow, the term "Measurement and Control Device" refers to the control section of the power converter. Although the Measurement and Control Device may take on many forms and perform many functions, this element may typically have one or more sense inputs, which may include converter input voltage, output voltage, current, temperature, etc. Based on these inputs, the Measurement and Control Device controls the power switch or switches within the converter via a control algorithm to achieve the desired function, and may also provide additional signal, data, or control outputs. The desired function may include regulating the output voltage, output current, input voltage, etc., or maximizing the power either drawn from the input or delivered to the output, charging a battery, or any other function that may be required of the power converter.

For example, Maximum Power Point Tracking (MPPT) may be employed to control the power converter for maximizing the converter output power delivered to a battery, an inverter, or other load. MPPT allows photovoltaic modules to produce all the power that they are capable of producing by varying the electrical operating point of the modules. MPPT, for instance, calculates the voltage at which the photovoltaic modules are able to produce maximum power regardless of present battery or load voltage. The power converter employing MPPT then converts the maximum power voltage at the converter input to the load voltage at the converter output. MPPT allows significant gains in delivered power relative to connecting the photovoltaic modules directly to the battery or load. Various known control algorithms may be used to adjust the maximum power point of the photovoltaic modules as the amount of the solar input to the modules vary and to adjust the load or battery charging current in accordance with the corresponding changes in the amount of the available power.

The Measurement and Control Device may be implemented in any number of ways, using digital or analog representations, and may typically include components such as comparators, operational amplifiers, application specific integrated circuits, pulse-width-modulation generators, and microcontrollers.

Figure 1:
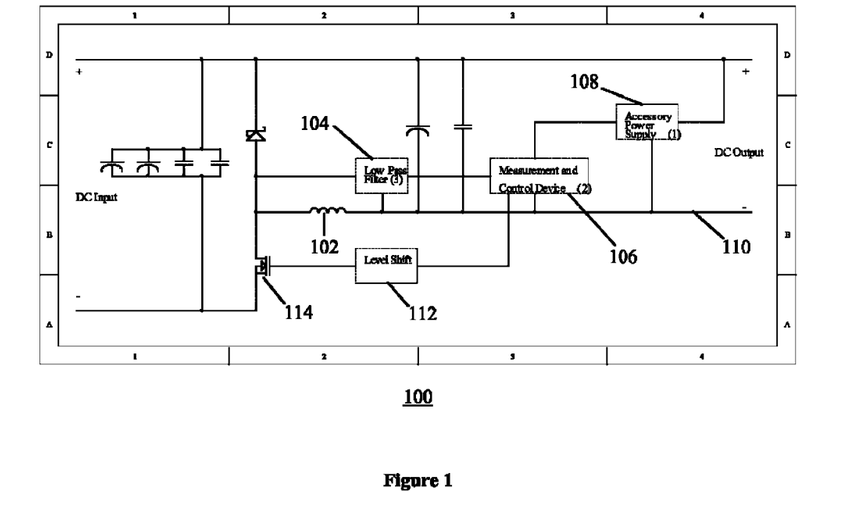
FIG. 1 is a schematic diagram illustrating a system for controlling a positive common configured DC-DC power converter in accordance with one embodiment of the disclosed subject matter.

FIG. 1 is a schematic diagram illustrating a system for controlling a positive common configured DC-DC power converter 100 in accordance with one embodiment of the disclosed subject matter. As illustrated in FIG. 1, the voltage across the inductor 102 is filtered by a conventional low-pass filter 104. In the preferred embodiment, this filter 104 is made of passive components in a conventional manner and has a gain of 1 at DC and relatively high input impedance. For example, the filter 104 may be a single or multi-stage inductor-capacitor (LC) or resistor-capacitor (RC) low-pass filter. In this example, the Measurement and Control Device 106 runs from a lower supply voltage than the DC output voltage of the converter 100, which is produced by an accessory power supply 108. Both the Accessory Power Supply 108 and the Measurement and Control Device 106 share a power supply rail 110 (ground in this example, which is also the negative DC output rail) in common with one end of one coil of the inductive component 102. The second end of said coil forms the input to the low-pass filter 104. The low pass filter 104 then produces a ground-referenced voltage that is proportional to the current through the inductor multiplied by the inherent resistance of the coil and filtered according to the transfer function of the filter 104. No level shifting of the analog signal is necessary, resulting in advantages in the Measurement and Control Device 106, such as better accuracy, lower cost, etc. Level shifting 112 may still be necessary elsewhere in the circuit, but this may typically be performed on higher level digital signals, such as the drive signal for the power switch 114, as illustrated in FIG. 1.

Figure 2:
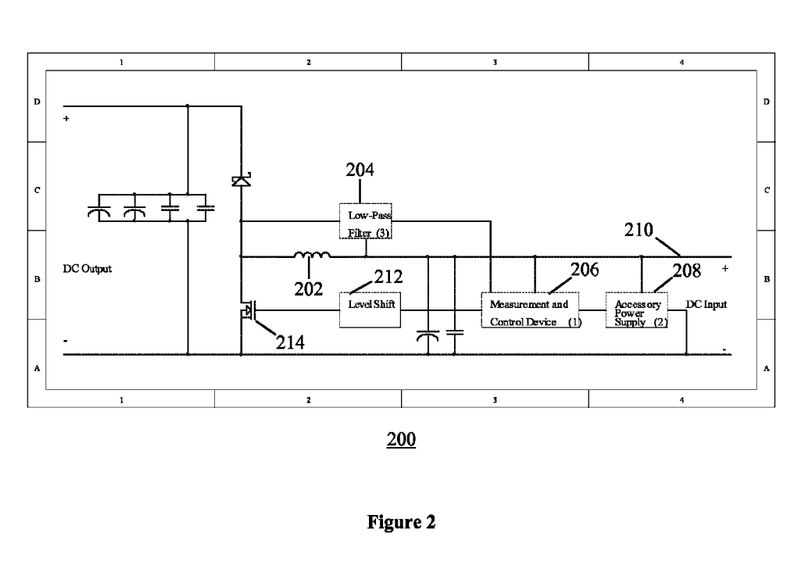
FIG. 2 is a schematic diagram illustrating a system for controlling a negative common configured DC-DC power converter in accordance with one embodiment of the disclosed subject matter.

FIG. 2 is a schematic diagram illustrating a system for controlling a negative common configured DC-DC power converter 200 in accordance with one embodiment of the disclosed subject matter. The Measurement and Control Device 206 uses the positive rail 210 of the DC input as its signal reference, which is shared with one terminal of the boost inductor 202. The Accessory Power Supply 208 supplies a regulated negative DC voltage relative to the positive rail 210 of the DC input in order to power the Measurement and Control Device 206. The output of the low-pass filter 204 is measured directly against the signal reference, with no level shifting or differential sensing required. The Measurement and Control Device 206 controls a main power switch 214 through a level shift circuit 212.

Figure 3:
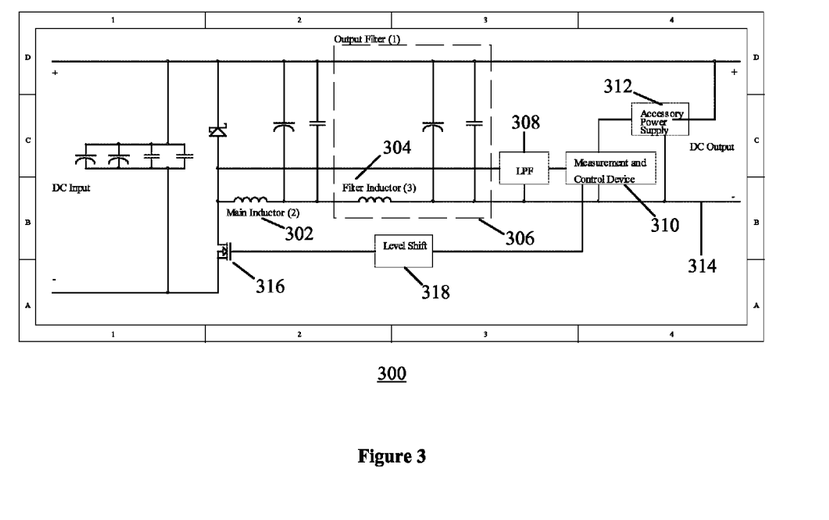
FIG. 3 is a schematic diagram illustrating a system for controlling a positive common configured DC-DC power converter including a power filter in accordance with the disclosed subject matter.

FIG. 3 is a schematic diagram illustrating a system for controlling a positive common configured DC-DC power converter 300 including a power filter in accordance with one embodiment of the disclosed subject matter. In this example, the power converter 300 includes an additional power filter 306 in order to reduce voltage or current ripple, or noise at the input or output. In this case the current measurement circuit 310 takes as its input the sum of the voltages across a main inductor 302 and a filter inductor 304. This technique results in a higher signal level than if the voltage across only one inductive component were monitored. The higher signal level may reduce the need for subsequent amplification or other processing, resulting in lower cost, higher accuracy, reduced parts count, or other benefits for the power converter 300. A similar embodiment may be used in any power conversion circuit where the current to be measured runs, in whole or in part, through two or more inductors or other magnetic elements.

Figure 4:
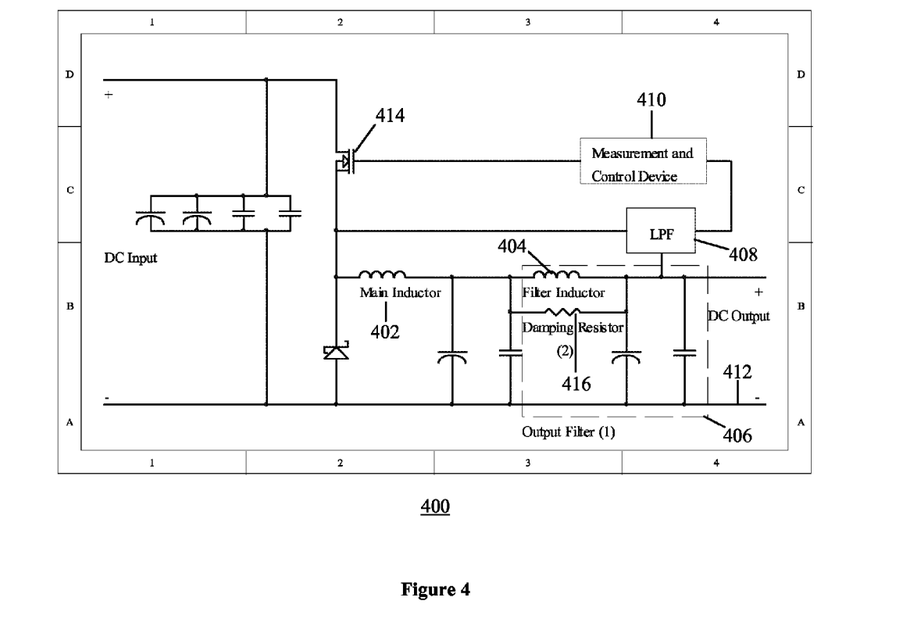
FIG. 4 is a schematic diagram illustrating a system for controlling a negative common configured DC-DC power converter including a power filter having a damping resistor in accordance with one embodiment of the disclosed subject matter.

FIG. 4 is a schematic diagram illustrating a system for controlling a negative common configured DC-DC power converter 400 including a power filter having a damping resistor in accordance with one embodiment of the disclosed subject matter. Although similar to the previous example, this embodiment shows the invention in use on a converter with a common negative rail 412, and with an output filter 406 that includes a damping resistor 416. The addition of the damping resistor 416 changes the transfer function from current to signal voltage slightly, but does not otherwise alter the functioning or the potential benefits of the disclosed system. This embodiment is one of many possible applications of the disclosed system to power converters that include power filters.

Figure 5:
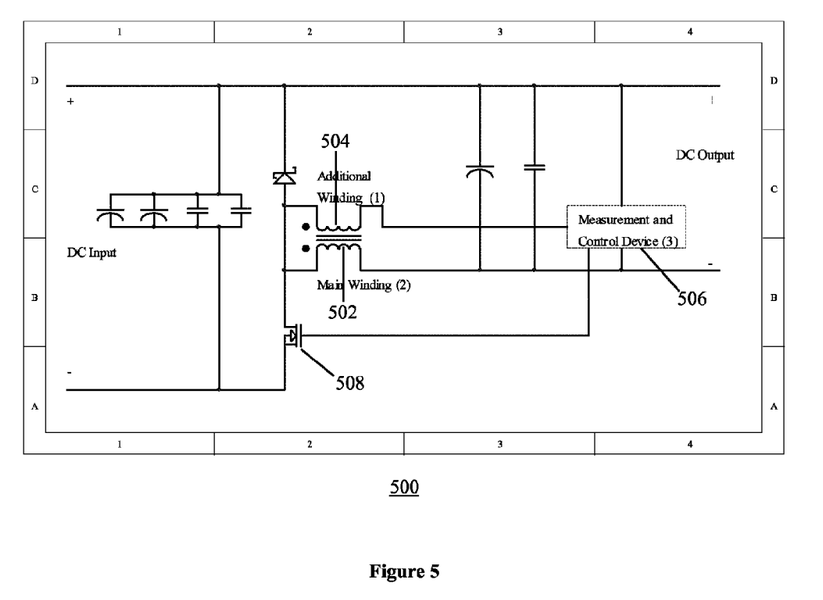
FIG. 5 is a schematic diagram illustrating a system for controlling a positive common configured DC-DC power converter including an inductive component having a main winding of wire and an additional winding of wire in accordance with one embodiment of the disclosed subject matter.

FIG. 5 is a schematic diagram illustrating a system for controlling a positive common configured DC-DC power converter 500 including an inductive component having a main winding of wire and an additional winding of wire in accordance with one embodiment of the disclosed subject matter. In this embodiment, a main inductor 502 includes an additional winding 504. In some embodiments, this additional winding 504 has the same number of turns as the main winding 502, and has a tight magnetic coupling to the main winding 502. The additional winding 504 is preferably wound in a bifilar fashion with the main winding 502. For best efficiency of the inductive component, the additional winding 504 is preferably of a substantially smaller cross-sectional area than the main winding 502. The ratio of cross sections is likely to be dominated by manufacturing concerns, with values in the range of 1:5 to 1:100 likely to be appropriate. However, a lesser ratio, including 1:1, may be used where total cross section of the windings is not critical to the performance of the inductive component. The additional winding 504 feeds the Measurement and Control Device 506 (which may include additional filtering). For this example, the Measurement and Control Device 506 is assumed to have a high input impedance such that the current flowing through the additional winding 504 is negligible.

In operation, the instantaneous voltage that appears across the additional winding 504 equals the instantaneous voltage across the main winding 502, minus the voltage lost over the resistance of the main winding 502 caused by the current flowing through the main winding 502. The main winding 502 and additional winding 504 are connected in such a way, or through separate inputs to a filter or subtractor circuit, that the instantaneous voltages are subtracted. The resulting voltage is the current flowing through the main winding 502 multiplied by the resistance of the main winding 502, as described above. In FIG. 5, this voltage appears at the input to the Measurement and Control Device 506, which may or may not include additional filters according to the desired function. This embodiment of the disclosed system has the benefit that the low-pass filter may be reduced in order or eliminated entirely in many applications, resulting in reduced parts count, reduced cost, or other advantages. It should be understood that many variations to this sensing scheme are possible, including a low pass filter that includes components connected to both terminals of the additional winding 504.

Figure 6:
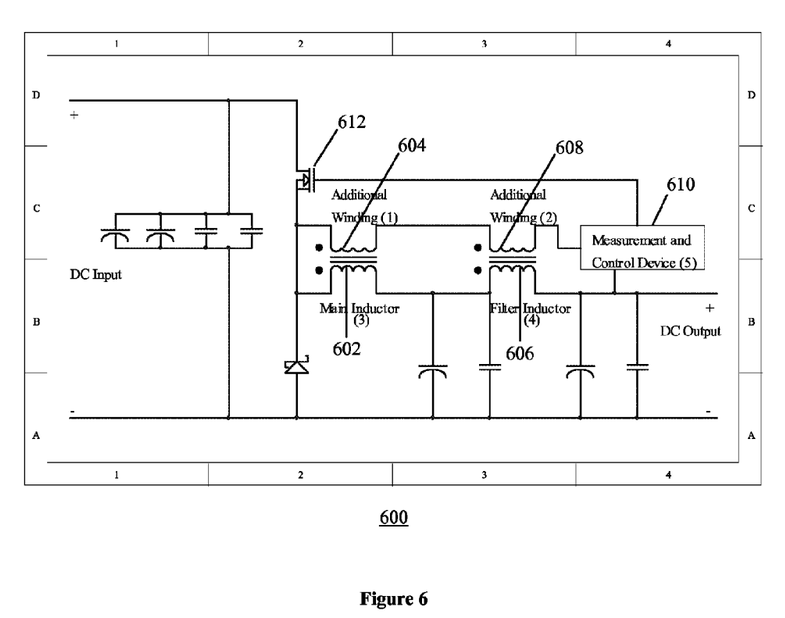
FIG. 6 is a schematic diagram illustrating a system for controlling a negative common configured DC-DC power converter including two inductive components, each having a main winding of wire and an additional winding of wire in accordance with one embodiment of the disclosed subject matter.

FIG. 6 is a schematic diagram illustrating a system for controlling a negative common configured DC-DC power converter 600 including two inductive components, each having a main winding of wire and an additional winding of wire in accordance with one embodiment of the disclosed subject matter. As illustrated in FIG. 6, the invention may be used on multiple inductive components in the same converter by adding multiple additional windings. In this embodiment, the multiple additional windings 604, 608 are used to cancel out the unwanted AC components of the voltages across the main windings 602, 606 of each magnetic element. In this embodiment, the signal voltage reaching the Measurement and Control Device 610 may be the sum of the instantaneous current through each main winding 602, 606 (these currents in general may be different), multiplied by the respective resistance of each main winding 602, 606. Due to this fact, this and similar embodiments are particularly useful when it is desired to know the average DC current running through the converter, rather than the instantaneous current.

Figure 7:
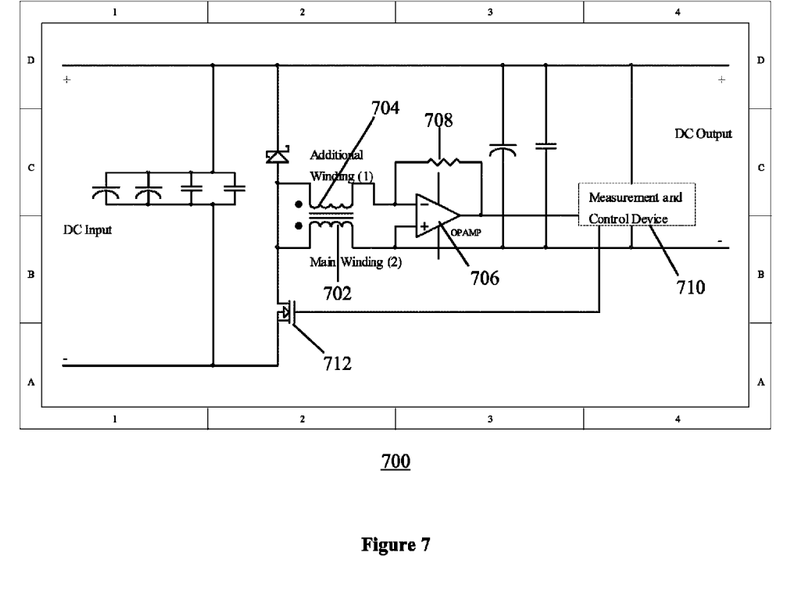
FIG. 7 is a schematic diagram illustrating a system for controlling a positive common configured DC-DC power converter including an inductive component having a main winding of wire and an additional winding of wire and an operational amplifier in accordance with one embodiment of the disclosed subject matter.

FIG. 7 is a schematic diagram illustrating a system for controlling a positive common configured DC-DC power converter 700 including an inductive component having a main winding of wire and an additional winding of wire and an operational amplifier in accordance with one embodiment of the disclosed subject matter. As illustrated in FIG. 7, the additional winding 704 is made of wire of the same material as the main winding 702, but with a much smaller cross-sectional area. To maintain efficiency of the converter, the cross sectional area of the additional winding would typically be chosen to be less than $1/100^{th}$ that of the main winding. If this is not possible due to manufacturing or other constraints, and a thicker additional winding should be used, a resistor may be placed in series with the additional winding 704 to simulate a thinner winding. The additional winding 704 feeds an analog circuit 706 (e.g., an operational amplifier circuit), which, in the preferred embodiment, has an input impedance much lower than the DC resistance of the additional winding 704. With this arrangement, the additional winding 704 passes a small current, smaller than the main inductor current by the ratio of the DC resistances of the two windings 702, 704. In this example, the current is converted into a voltage for use by the measurement and control circuit 710.

This arrangement has the advantage that, since the main winding 702 and additional winding 704 may be in physical proximity, these windings may typically be at about the same temperature. Because they may also be of the same material, their DC resistances may vary in the same proportion, and the temperature variation inherent in other current measurement schemes that utilize the parasitic resistance of an inductive component may be substantially eliminated. Note that if a resistor has been placed in series with the additional winding 704 to simulate a thinner winding, the temperature variation may not be entirely canceled. In this case, any conventional technique may be used to cancel the remaining temperature variation, including, for example, the use, as the added resistance in series with the additional winding 704, of a thermistor in thermal proximity to the magnetic component and having the same thermal coefficient of resistance as the winding material.

Component and temperature variations may affect the DC resistance of the inductive components 702, 704. Although the embodiment described in FIG. 7 substantially eliminates temperature dependence from the current measurement, other embodiments may still be affected by these variations. In the presence of these variations, this current measurement technique may still be applied to particular advantage when only a relative measurement of current is desired, e.g., when maximizing the power drawn from a source of renewable energy is desired and for devices that convert solar, wind, or water power to electricity.

In these applications, it is mainly necessary to compare currents, and to do so at rapid time intervals. In these instances, the one-time variation caused by component variations, and the slow drift in winding resistance cause by changes in the temperature of the inductive component may not cause a problem. If higher accuracy is desired, the initial part variation may be calibrated out in any conventional way, such as via a trimpot or a value stored in digital memory within the Measurement and Control Device. To compensate for the temperature variation, which in a typical embodiment may be attributable to the thermal resistivity coefficient of the wire used in the inductive component, the temperature of the inductive component may be measured directly, or estimated by, for example, the DC and or AC currents flowing through the component and the known dissipation and thermal resistance constants. Based on this temperature, the Measurement and Control Device may apply a correction to the measured current in any conventional way according to the known thermal variation of the resistance of the inductive component.

In any of these embodiments of the invention, if the Measurement and Control Device processes the signal from the low-pass filter with an analog to digital converter (ADC), it may be beneficial to reduce the attenuation of the low-pass filter such that the resulting signal has at least 1 least-significant-bit (LSB) of noise or ripple. Via the conventional technique of oversampling, this noise or ripple may allow the ADC to obtain more resolution, i.e., a smaller effective LSB, with a corresponding decrease in measurement bandwidth, given a fixed sampling rate.

It should also be noted that the sensed current path through the inductive component may also include, or be wholly composed of, other circuit elements with parasitic resistance, such as input and output filter inductors, wires, printed circuit board traces, solder, fuses, explicit resistors, switches, MOSFETs, diodes, active devices, etc.

In all of the techniques that involve a low-pass filter, it should be understood that a single-pole filter, such as an RC network, with a time constant substantially equal to the main inductor L/R dc time constant, may be used. The benefits of this arrangement are well described in the prior art. For example, the MicroSemi/Linfinity Application Note AN-7 is available at: http://www.microsemi.com/micnotes/1302.pdf.

The disclosed system is also intended to cover applications that combine more than one of the various aspects described herein.

The disclosed system is intended to cover application in all topologies of electrical power converters where current flows through an inductive component or other component with a parasitic resistance. Example embodiments of the invention have been given in non-isolated buck and boost DC-DC converters, although the disclosed system may be applied to other topologies including, but not limited to: isolated or transformer-coupled converters, converters with synchronous rectifications, resonant or losslessly-switched converters, buck-boost converters, multiphase converters, DC-AC inverters, AC-AC converters, etc. In these cases the "inductive component" or "main inductor" mentioned herein may include additional windings to function as a transformer.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above. Further, the features of the disclosed embodiments can be combined, rearranged, etc. within the scope of the invention to produce additional embodiments.

What is claimed is:

1. A system for controlling a power converter having an inductive component including a first end and a second end, comprising:
    a low pass filter for producing a ground-referenced voltage across the inductive component that is proportional to an average DC current flowing through the inductive component, wherein the low pass filter is electrically connected to both the first end and second end of the inductive component through circuit elements capable of passing a DC current at all times during normal operation of controlling the power converter; and
    a control device electrically coupled to the low pass filter for:
        calculating the average DC current through the inductive component using the ground-referenced voltage; and
        controlling the power converter using the calculated average DC current, wherein controlling the power converter comprises one of:
            controlling the power converter for maximizing converter input current,
            controlling the power converter for maximizing converter input power,
            controlling the power converter for maximizing converter output current, and
            controlling the power converter for maximizing converter output power.

2. The system of claim 1, wherein the low pass filter is further configured for sharing a signal reference in common with the control device.

3. The system of claim 1, wherein the low pass filter consists of passive components.

4. The system of claim 1, wherein the control device comprises at least one of:
    one or more microcontrollers; and
    one or more application specific integrated circuits.

5. The system of claim 1, wherein the power converter is electrically coupled to a photovoltaic array and draws input power from the photovoltaic array.

6. The system of claim 1, wherein the power converter is electrically coupled to an energy storage device and delivers output power to the energy storage device.

7. The system of claim 6, wherein the energy storage device comprises a battery.

8. The system of claim 1, further comprising a power filter having at least one inductive element, wherein the power filter is electrically interposed between the inductive component and the low pass filter.

9. A method for controlling a power converter having an inductive component including a first end and a second end, comprising:
    electrically transmitting a current having an average DC level through the inductive component to a low pass filter, wherein the low pass filter is electrically connected to both the first end and the second end of the inductive component through circuit elements capable of passing a DC current at all times during normal operation of controlling the power converter;
    filtering a voltage across the inductive component through the low pass filter to produce a ground-referenced voltage proportional to the average DC level;
    electrically transmitting the ground-referenced voltage to a control device;
    calculating the average DC level using the ground-referenced voltage; and
    controlling the power converter using the calculated average DC level, wherein controlling the power converter comprises one of:
        controlling the power converter for maximizing converter input current,
        controlling the power converter for maximizing converter input power,
        controlling the power converter for maximizing converter output current, and
        controlling the power converter for maximizing converter output power.

10. The method of claim 9, further comprising electrically receiving input power from a photovoltaic array.

11. The method of claim 9, further comprising electrically delivering output power to an energy storage device.

12. The method of claim 9, wherein the low pass filter comprises a low pass filter consisting of passive components.

* * * * *